United States Patent

Mounts

[11] 3,861,237
[45] Jan. 21, 1975

[54] PARKING BRAKE ACTUATING MECHANISM

[75] Inventor: William T. Mounts, Chillicothe, Ill.

[73] Assignee: Caterpillar Tractor Co., Peoria, Ill.

[22] Filed: May 29, 1973

[21] Appl. No.: 364,925

[52] U.S. Cl.......................... 74/516, 74/512, 74/539
[51] Int. Cl............................................. G05g 1/04
[58] Field of Search ............. 74/512, 516, 518, 539, 74/542, 560

[56] References Cited
UNITED STATES PATENTS

| | | | |
|---|---|---|---|
| 2,943,511 | 7/1960 | Johnstone | 74/539 X |
| 3,261,438 | 7/1966 | Binder | 74/516 X |

Primary Examiner—Benjamin W. Wyche
Assistant Examiner—Frank H. McKenzie, Jr.
Attorney, Agent, or Firm—Phillips, Moore, Weissenberger, Lempi & Strabala

[57] ABSTRACT

A parking brake actuating mechanism comprises a pedal actuated lever and a bellcrank, both pivotally mounted on a stationary support. A link is pivotally interconnected between the lever and a first arm of the bellcrank and a brake actuating linkage is interconnected between a second arm of the bellcrank and a conventional parking brake. Upon depression of the pedal actuated lever, the bellcrank will pivot to engage the parking brake whereupon a manually releasable detent mechanism will automatically hold the parking brake in such an engaged condition of operation.

14 Claims, 3 Drawing Figures

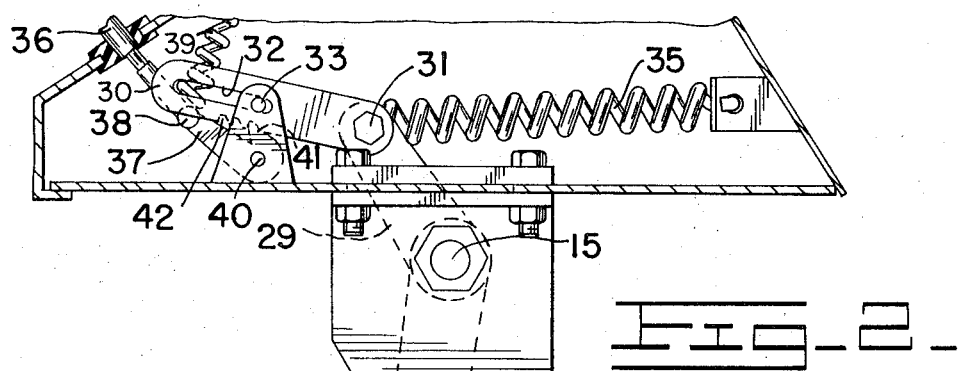
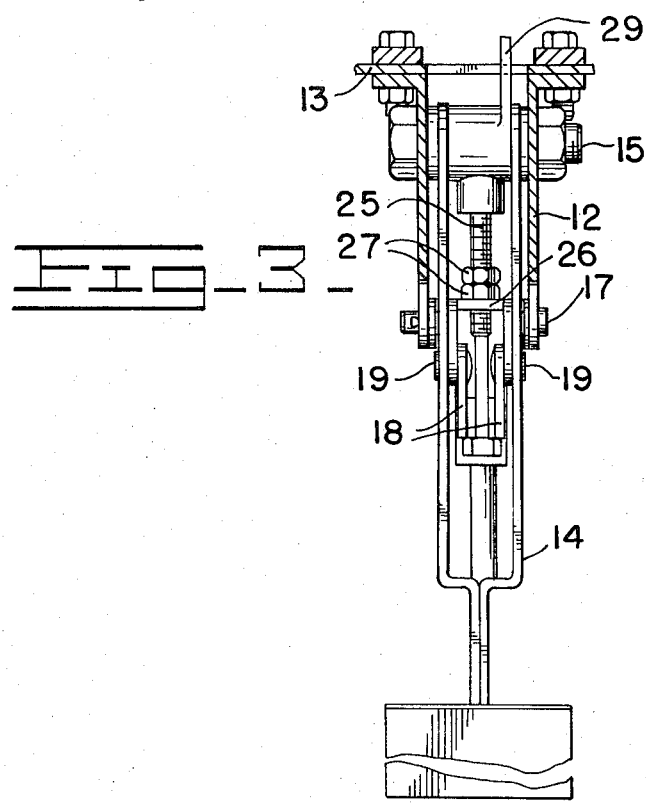

PARKING BRAKE ACTUATING MECHANISM

BACKGROUND OF THE INVENTION

Heavy duty construction machinery are normally equipped with operator-controlled parking brakes in the cabs thereof. The parking brakes are oftentimes hand-actuated which gives rise to brake actuation problems, particularly during an emergency situation wherein the operator finds it difficult to actuate the brake and simultaneously steer and maintain his visual contact with the work site. Such problems have given rise to the employment of foot-actuated brake mechanisms, such as those disclosed in U.S. Pat. Nos. 2,881,872; 2,986,046; 3,194,083 and 3,693,472.

SUMMARY OF THE INVENTION

An object of this invention is to provide a non-complex, compact and economical brake actuating mechanism which exhibits a high degree of mechanical advantage and is adapted to be actuated and released expeditiously. The brake actuating mechanism comprises a pedal actuated lever and bellcrank, both pivotally mounted on a stationary support. A link pivotally interconnects the lever and a first arm of the bellcrank and a brake actuating linkage means is connected to a second arm of the bellcrank to be reciprocated upon depression of the pedal actuated lever. In the preferred embodiment of this invention, a combined brake locking and release means is operatively connected to the pedal actuated lever to automatically lock the mechanism in its brake engaged condition of operation and to selectively release the mechanism to its brake disengaged condition of operation.

BRIEF DESCRIPTION OF THE DRAWINGS

Other objects of this invention will become apparent from the following description and accompanying drawings wherein:

FIG. 2 is a view similar to FIG. 1, but disclosing the brake actuating mechanism in its brake engaged condition of operation; and FIG. 3 is a view taken in the direction of arrows III—III in FIG. 1.

DETAILED DESCRIPTION

Figure 1:
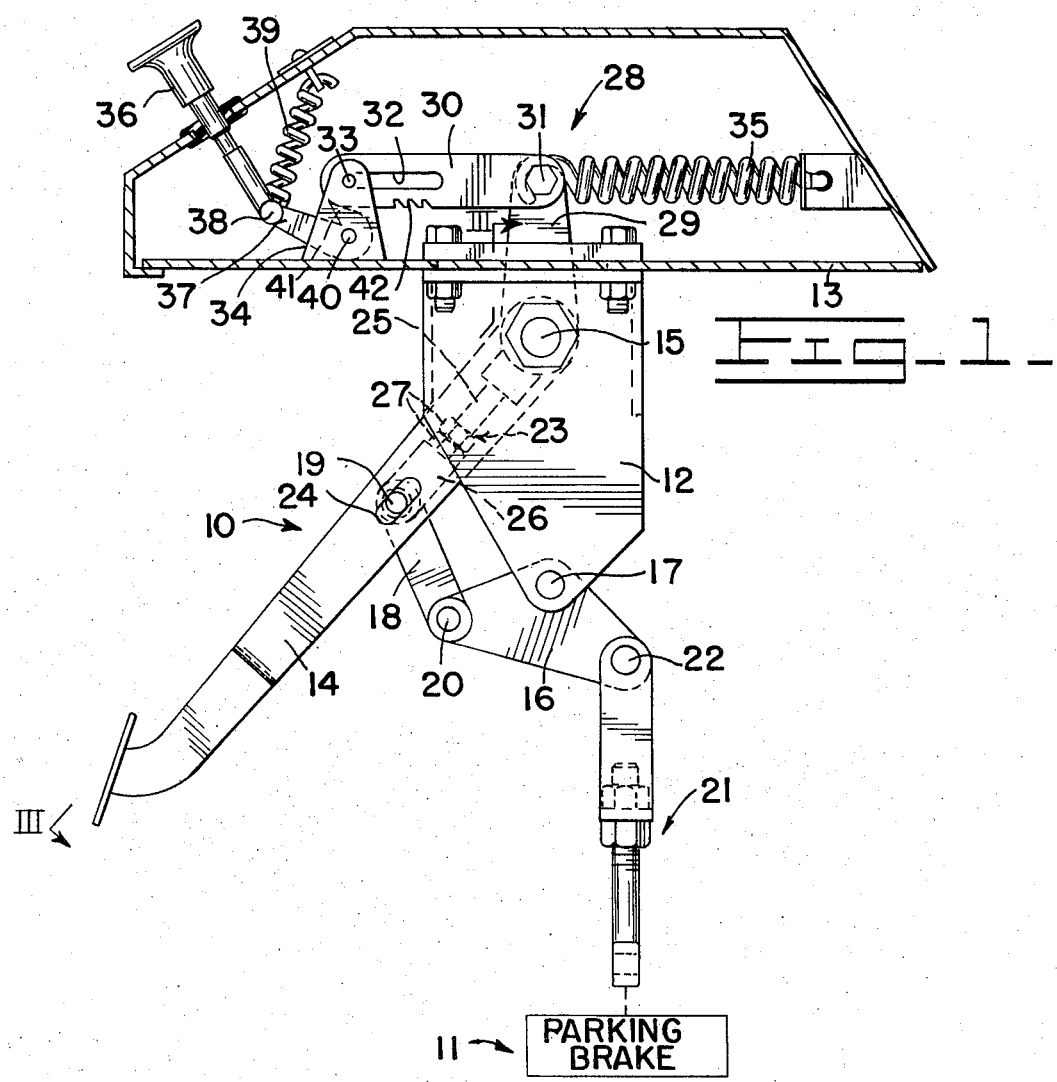
FIG. 1 is a side elevational view of a brake actuating mechanism and a combined brake locking and release means therefor.

FIG. 1 discloses a brake actuating mechanism 10 adapted to selectively engage a standard parking brake, schematically illustrated at 11. The mechanism is mounted on a stationary support comprising a bracket 12 secured to the underside of a dashboard 13, mounted in the cab of a construction machine or the like. The brake actuating mechanism comprises a pedal actuated lever 14 pivotally mounted on an upper end of the bracket by a bolt or pin 15.

The mid-portion of a bellcrank 16 is pivotally mounted on a lower end of the bracket by a pin 17 and a pair of links 18 are pivotally interconnected between the lever and a first arm of the bellcrank by pins 19 and 20, respectively. A conventional brake actuating means, such as a standard push-pull cable assembly 21, has its upper end pivotally connected to a second arm of the bellcrank by a pin 22. The opposite end of the actuating means may be connected to parking brake 11 in a conventional manner to actuate the same upon reciprocation of the actuating means.

Referring to FIGS. 1 and 3, adjustment means 23 are provided for selectively adjusting pivot pins 19 axially in slots 24, formed in the bifurcated portion of lever 14. Such adjustment means may comprise an adjustable rod 25 having its first end pivotally mounted on pivot pin 15 and a U-shaped member 26, having pins 19 secured thereto, threadably mounted on the opposite end of the rod. A pair of lock nuts 27 are also threadably mounted on the rod to selectively position member 26 and thus pivot pins 19 on the lever.

A combined brake locking and release means 28 is operatively connected to the brake actuating mechanism to automatically place and maintain the brake in its engaged condition of operation upon depression of pedal actuating lever 14 and to permit manual release of the brake to its FIG. 1 disengaged condition of operation. Such mechanism comprises a second lever 29 connected to first lever 14 to form a bellcrank therewith, pivotally mounted on pin 15. The upper end of lever 29 is pivotally connected to a slide bar 30 by a pin 31.

The slide bar has an elongated slot 32 formed therein which slidably engages a stationary pin 33, secured to an upstanding bracket 34 secured on dashboard 13. A first spring means, such as tension coil spring 35, is connected between the dashboard and the opposite end of the slide bar to normally retract the slide bar rightwardly to its FIG. 1 position. Such retraction in turn automatically functions to move the brake actuating mechanism to its illustrated brake disengaged condition of operation.

A manually controlled handle 36 projects through the dashboard and into the operator's cab and is pivotally mounted at its lower end to a pawl 37 by a pin 38. A second spring means, such as tension coil spring 39, is connected between the dashboard and pin 38 to bias the pin upwardly to pivot the pawl in a clockwise direction about a pin 40, pivotally mounting the pawl on bracket 34. The pawl has a tooth 41 formed thereon to selectively engage one of three notches 42, formed on the underside of slide bar 30, to form a ratchet and pawl mechanism for automatically locking the brake in its engaged condition of operation.

In operation, engagement of parking brake 11 (FIG. 1) is effected by depressing pedal actuated lever 14 to move the brake actuating mechanism into its FIG. 2 position. In particular, such depression will pivot levers 14 and 29 counterclockwise about pivot pin 15, to a near over-center position wherein pivot pins 15, 19 and 20 are maintained in general alignment, to raise brake actuating means 21 upwardly and to simultaneously move slide bar 30 leftwardly. Upon such movement of the slide bar, against the biasing force of retraction spring 35, tooth 41 of the pawl will engage one of the notches 42, under the biasing force of spring 39, to lock the brake in its engaged condition of operation.

Thereafter, handle 36 may be depressed to pivot pawl 37 counterclockwise, about pivot pin 40, to disengage tooth 41 from its engaged notch. Spring 35 will then retract slidebar 30 to return mechanism 10 to its FIG. 1 position to disengage brake 11.

What is claimed is:

1. A brake actuating mechanism comprising a stationary support, a pedal actuated lever pivotally mounted on said support, a bellcrank pivotally mounted on said support, a link pivotally interconnected between said lever and a first arm of said bellcrank, brake actuating means connected to a second arm of said bellcrank and adapted to be connected to a parking brake, and adjustment means for selectively adjusting the position of a first pivot pin, pivotally mounting said link on said lever, axially along said lever.

2. The brake actuating mechanism of claim 1 further comprising a parking brake operatively connected to said brake actuating means.

3. The brake actuating mechanism of claim 1 wherein said adjustment means comprises an adjustable rod pivotally mounted on said support by a second pivot pin also pivotally mounting said lever on said support, said first pivot pin secured to a member adjustably mounted on said rod and said first pivot pin projecting through an elongated slot formed in said lever.

4. The brake actuating mechanism of claim 1 further comprising combined brake locking and release means for automatically locking said mechanism in its brake engaged condition of operation and for manually unlocking said mechanism to release it to its brake disengaged condition of operation.

5. The brake actuating mechanism of claim 4 wherein said combined brake locking and release means comprises a second lever connected to said first-mentioned lever, a slide bar movably mounted on said support and pawl and ratchet means for automatically locking said slide bar and said first-mentioned lever in said brake engaged condition of operation.

6. The brake actuating mechanism of claim 5 wherein the pawl and ratchet means comprises a pawl pivotally mounted on said support and at least one notch formed on said slide bar adapted to be engaged by a tooth of said pawl.

7. The brake actuating mechanism of claim 6 further comprising a handle pivotally mounted on said pawl.

8. The brake actuating mechanism of claim 7 further comprising spring means for urging the tooth of said pawl into pivoted engagement with said notch.

9. The brake actuating mechanism of claim 8 further comprising second spring means for urging said slide bar to a retracted position disengaging the tooth of said pawl from said notch.

10. In combination with a brake actuating mechanism, a combined brake locking and release means for automatically locking said mechanism in its brake engaged condition of operation and for manually unlocking said mechanism to release it to its brake disengaged condition of operation comprising a lever, a slide bar movably mounted on a support and pawl and ratchet means for automatically locking said slide bar and said lever in said brake engaged condition of operation.

11. The combination of claim 10 wherein the pawl and ratchet means comprises a pawl pivotally mounted on said support and at least one notch formed on said slide bar adapted to be engaged by a tooth of said pawl.

12. The combination of claim 11 further comprising a handle pivotally mounted on said pawl.

13. The combination of claim 12 further comprising spring means for urging the tooth of said pawl into pivoted engagement with said notch.

14. The combination of claim 13 further comprising second spring means for urging said slide bar to a retracted position disengaging the tooth of said pawl from said notch.

* * * * *